Patented Mar. 9, 1943

2,313,124

UNITED STATES PATENT OFFICE 2,313,124

HIGHLY RESISTANT HECTOGRAPH BLANKET

William J. Champion, Chicago, Ill., assignor to Ditto, Incorporated, Chicago, Ill., a corporation of West Virginia No Drawing. Application August 19, 1941, Serial No. 407,441

5 Claims. (Cl. 41—31.6)

The invention relates to a hectograph blanket and more particularly to a gelatin type hectograph blanket adapted to be formed into a roll and used in the ordinary type hectograph duplicating machines.

An object of the invention is to provide a hectograph blanket having exceptional heat and humidity resistance while requiring little if any conditioning and having high copy strength.

In the ordinary hectograph blanket the copy mass comprises a gelatin gel having at least five times as much solvent and plasticizer as gelatin. These gelatin gels are ordinarily tanned so that the gel will have a softening point of considerably below 70° C.

Attempts have been made to increase the heat and humidity resistance of gelatin hectograph masses by tanning the masses to a high degree. However, when the hectograph compositions are tanned to a softening point of higher than about 70° C. the copy papers have a tendency to pick up particles of the hectograph mass. This is called burning and is a highly undesirable phenomena.

In accordance with this invention, I overcome the burning defect in highly tanned hectograph masses by incorporating in the hectograph composition a minor proportion of a glycol solvent. The glycol solvent is incorporated in the composition preferably within the range of from 5 to 15%.

The following example of an experiment is given to illustrate the invention:

Hectograph masses were prepared having the following composition:

| | |
|---|---|
| Gelatin 200 bloom _____ parts by weight__ | 1 |
| Water _____ do____ | 1½ |
| Plasticizer _____ do____ | 10 |
| Potassium bichromate_____ | |
| _____ per cent of the gelatin present__ | .6 |

The only difference between the masses was in the plasticizer, the composition of the plasticizer in relation to burning action being tabulated below:

*Percentage of anti-burning agent in the plasticizer, the balance being glycerin*

| | | |
|---|---|---|
| 1. None | | Strong burning action. |
| 2. Ethylene glycol | 5% | Slight burning, great improvement over 1. |
| 3. Ethylene glycol | 15% | Do. |
| 4. Propylene glycol | 10% | Do. |
| 5. Propylene glycol | 3% | No burning. |
| 6. Propylene glycol | 6% | Do. |
| 7. Propylene glycol | 18% | Do. |
| 8. Carbitol | 5% | Do. |
| 9. Diethylene glycol | 10% | Do. |

It is thus shown that the above substances, all of which are glycol type solvents, greatly and unexpectedly reduce burning in very highly tanned hectograph rolls, rendering usable compositions which without these agents could not be used.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

Example 1

| | Per cent |
|---|---|
| Gelatin, bloom strength 220 | 7 |
| Water | 10 |
| Phthalic glycerin resin | 1 |
| Glycerin | 72 |
| Ethylene glycol | 9¾ |
| Formaldehyde (40%) | ¼ |

Example 2

| | Parts by weight |
|---|---|
| Gelatin, bloom strength 220 | 30 |
| Water | 45 |
| Glycerin | 270 |
| Propylene glycol | 30 |
| Formaldehyde (40%) | 1.2 |

To prepare the compositions, the gelatin was first soaked in the water, then warmed to 53° C. and added to the other ingredients, which have been thoroughly intermixed and preheated to 62° C.

It is to be understood the term "glycol" solvent broadly includes also the glycol ethers, glycol alcohol-ethers, and glycol derivative esters having dye solvent properties and being substantially non-volatile.

Obviously, any tanning agent is an equivalent of the formaldehyde shown in the examples when it is used in quantity sufficient to raise the softening point of the masses used, to a point exceeding approximately 70° C., as determined by the "ring and ball" method.

It is realized that the invention is broadly applicable to all duplication compositions which are subject to burning or picking because of exceptionally high tanning.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A hectograph blanket comprising a copy mass of a tanned gelatin gel having a softening point of at least 70° C., and including glycerine and from 5 to 15% of a glycol solvent homogeneously dispersed throughout the entire mass of the gel.

2. A hectograph blanket comprising a copy mass of a tanned gelatin gel having a softening point of at least 70° C., and including from 5 to 15% of a glycol solvent, and glycerine in larger amount than said glycol, said glycol and glycerine being homogeneously dispersed throughout the entire mass of the gel.

3. A hectograph blanket comprising a copy mass of a tanned gelatin gel having a softening point of at least 70° C., and including from 5 to 15% of ethylene glycol, and glycerine in larger amount than said glycol, said glycol and glycerine being homogeneously dispersed throughout the entire mass of the gel.

4. A hectograph blanket comprising a copy mass of a tanned gelatin gel having a softening point of at least 70° C., and including from 5 to 15% of diethylene glycol, and glycerine in larger amount than said glycol, said glycol and glycerine being homogeneously dispersed throughout the entire mass of the gel.

5. A hectograph blanket comprising a copy mass of a tanned gelatin gel having a softening point of at least 70° C., and including from 5 to 15% of propylene glycol, and glycerine in larger amount than said glycol, said glycol and glycerine being homogeneously dispersed throughout the entire mass of the gel.

WILLIAM J. CHAMPION.